Oct. 26, 1926.
E. A. DICK ET AL
1,604,567
AGRICULTURAL IMPLEMENT
Filed Nov. 1, 1924     2 Sheets-Sheet 1
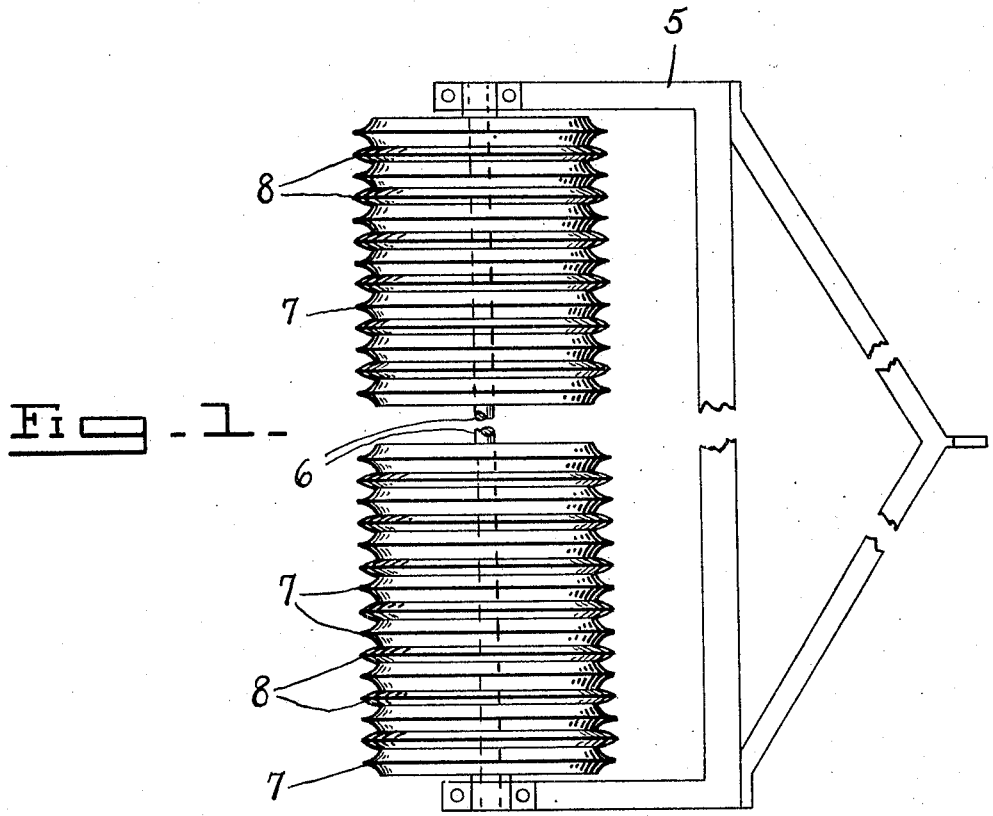
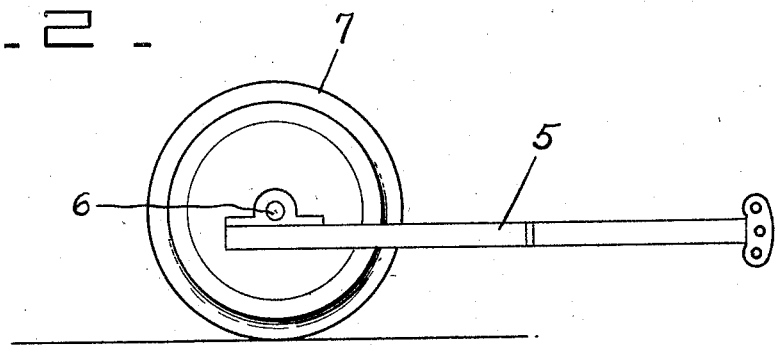
Inventors
Ernest A. Dick &
Roy L. Dick
By L. B. James    ATTORNEY Oct. 26, 1926.

E. A. DICK ET AL 1,604,567

AGRICULTURAL IMPLEMENT

Filed Nov. 1, 1924    2 Sheets-Sheet 2

Inventors
Ernest A Dick &
Roy L. Dick
By L. B. James
ATTORNEY

Patented Oct. 26, 1926.

1,604,567

UNITED STATES PATENT OFFICE.

EARNEST ALLEN DICK AND ROY LAVERN DICK, OF GRAND LEDGE, MICHIGAN.

AGRICULTURAL IMPLEMENT.

Application filed November 1, 1924. Serial No. 747,212.

This invention relates to agricultural implements and more particularly to cultipackers.

The primary object of this invention resides in simplifying the construction and operation of cultipackers so as to obtain the maximum results in preparing the soil prior to planting.

Another object of this invention resides in the provision of a cultipacker constructed to eliminate the necessity of arranging the disks on separate shafts in alternate spaced relation between one another.

A still further object of this invention resides in the provision of a cultipacker having a series of main and auxiliary disks carried in axial alignment on a shaft.

In addition to the aforesaid objects, this invention resides in the particular construction of the main and auxiliary disks and also their disposition for functioning cooperatively and independently.

With these and other objects in view, this invention resides in certain novel features of construction, arrangement and combination of elements to be hereinafter set forth in the specification, illustrated in the accompanying drawings and pointed out in the appended claim and, while the disclosure depicts our present conception of the invention, the right is reserved to resort to such changes in arrangement and construction as come within the scope of the claim.

In the accompanying drawings forming a part of this application:

Fig. 1 is a plan view of a cultipacker as constructed in accordance with this invention.

Fig. 2 is a side view thereof.

Figure 3:
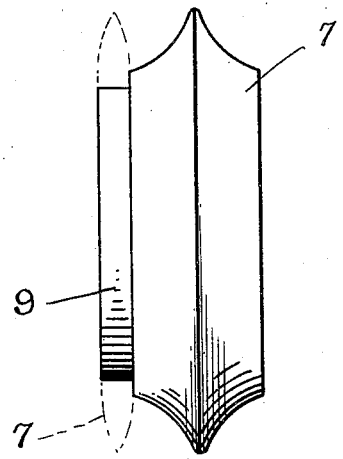
Fig. 3 is an enlarged detail edge view of one of the disks.
Figure 4:
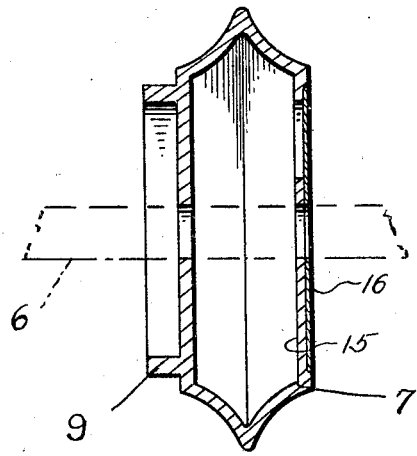
Fig. 4 is an enlarged cross sectional view thereof.
Figure 5:
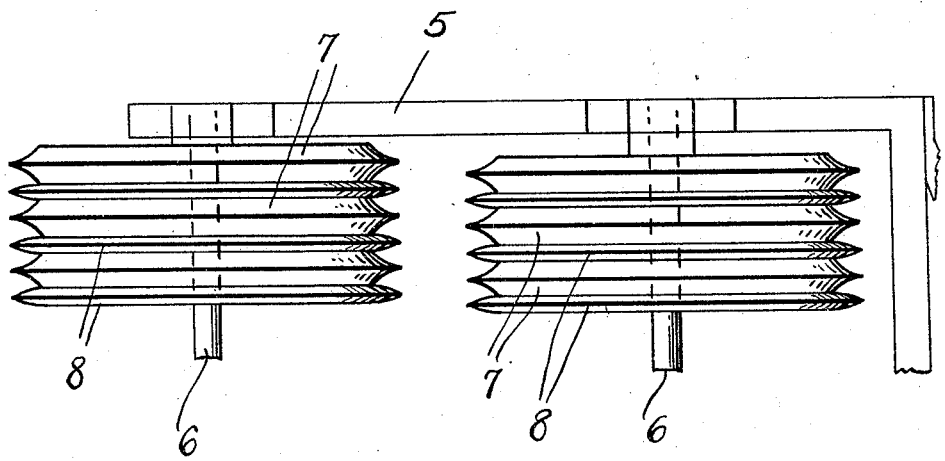
Fig. 5 is a plan view similar to that shown in Fig. 1.

In the present embodiment of this invention, the numeral 5 designates a suitable frame carrying a shaft 6 on which is journaled a series of disks 7 which are herein distinguished from other disks 8 cooperating therewith in that the former are to be considered the main disks and the latter auxiliary disks.

The main disks 7 are preferably hollow with open sides and formed with peripheries of substantially V-shaped contours but, as conditions require the utilization of disks having other configurations, the same can be manufactured in various forms without departing from the invention. Formed on or otherwise circumferentially disposed to the axis of each main disk is an annular flange 9 on which is journaled one of the auxiliary disks 8 for independent rotation in axial alignment therewith. In order to close the open sides of the main disks annular depressions 15 are provided for the reception of cover plates 16. The aforesaid cover plates prevent dirt from collecting in the hollow main disks and permit the assemblage of a multiplicity of main and auxiliary disks in compact relation.

While the disclosure herewith shows the main disk 7 as having an annular flange 9 on one side thereof, flanges on opposite sides of the main disks may be provided where conditions require the utilization of two auxiliary disks for each main disk.

With a cultipacker constructed as aforesaid, the soil can be prepared more satisfactorily than where it is treated by an implement having disks disposed in alternate spaced relation on different carrying shafts, and further through the particular arrangement and construction of the embodiment any type of draft means can be employed as the implement is light and easily drawn.

Although the invention particularly sets forth an implement having but a single disk supporting shaft, the invention can be practiced with equal success with the disks arranged as aforesaid and utilized in the common manner of disposing them in alternate relation. This will require additional power to drag the implement but will repeat the operation of the leading series of disks.

What we claim and desire to protect by Letters Patent is:

A cultipacker of the character set forth, the combination of a frame, a shaft carried thereby, hollow main disks having open sides and annular depressions in the open sides, cover plates in the annular depressions of the open sides of the main disks, annular flanges on one side of the main disks, auxiliary disks journaled on the flanges of the main disks, and a draft element carried by the frame.

In testimony whereof we affix our signatures.

EARNEST ALLEN DICK.
ROY LAVERN DICK.